United States Patent
Choi et al.

(10) Patent No.: US 6,450,798 B1
(45) Date of Patent: Sep. 17, 2002

(54) APPARATUS FOR MULTIPLE CAVITY INJECTION MOLDING

(75) Inventors: Jae Hong Choi, Carmel, IN (US); Jerald L. Golmanavich; Barry B. Hofmaster, both of Omaha, NE (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/497,893

(22) Filed: Feb. 4, 2000

(51) Int. Cl.[7] ............................................... B29C 45/22
(52) U.S. Cl. .................................... 425/572; 264/328.8
(58) Field of Search ................................. 425/572, 588; 264/328.8

(56) References Cited

U.S. PATENT DOCUMENTS

| | | |
|---|---|---|
| 3,797,984 A | 3/1974 | Yago et al. |
| 3,959,433 A | 5/1976 | Sauers |
| 4,069,003 A | 1/1978 | Cecchi |
| 4,120,921 A | 10/1978 | Webster |
| 4,120,922 A | 10/1978 | Lemelson |
| 4,451,225 A | 5/1984 | Harding |
| 4,597,836 A | 7/1986 | Schaer et al. |
| 4,601,870 A | 7/1986 | Sasaki |
| 4,662,837 A | 5/1987 | Anderson |
| 4,711,602 A | 12/1987 | Baker |
| 4,717,327 A | 1/1988 | Faneuf |
| 4,781,554 A | 11/1988 | Hendry |
| 4,793,954 A | 12/1988 | Lee et al. |
| 4,828,769 A | 5/1989 | Maus et al. |
| 4,900,242 A | 2/1990 | Maus et al. |
| 4,942,010 A | 7/1990 | Baker |
| 4,965,028 A | 10/1990 | Maus et al. |
| 4,966,545 A | 10/1990 | Brown et al. |
| 5,037,598 A | 8/1991 | Akselrud |
| 5,149,547 A | 9/1992 | Gill |
| 5,219,512 A | 6/1993 | Tsutsumi |
| 5,227,179 A | 7/1993 | Benenati |
| 5,260,012 A | 11/1993 | Arnott |
| 5,275,778 A | 1/1994 | Von Holdt, Sr. |
| 5,306,134 A | 4/1994 | Gill |
| 5,361,826 A | 11/1994 | Yamauchi et al. |
| 5,443,381 A | 8/1995 | Gellert |
| 5,511,968 A | 4/1996 | Guzzini et al. |
| 5,543,092 A | 8/1996 | Ibar |
| 5,551,857 A | 9/1996 | Fujioka et al. |
| 5,582,851 A | 12/1996 | Hofstetter et al. |
| 5,605,707 A | 2/1997 | Ibar |
| 5,731,014 A | 3/1998 | Travaglini |
| 5,849,236 A | 12/1998 | Tatham |
| 5,851,474 A | 12/1998 | Allan et al. |
| 5,885,495 A | 3/1999 | Ibar |
| 5,891,381 A | 4/1999 | Bemis et al. |
| 5,945,139 A | 8/1999 | Price et al. |
| 5,971,734 A | * 10/1999 | Moon .......................... 425/572 |

* cited by examiner

Primary Examiner—Tim Heitbrink
(74) Attorney, Agent, or Firm—Ryan, Mason & Lewis, LLP

(57) ABSTRACT

A runner system and runner component particularly adapted for use in multiple cavity injection molding systems is disclosed. The runner system and runner component utilize particular structural features and geometrical configurations that have been found to result in superior molding practices and molded components in multiple cavity injection molding systems. A corresponding multiple cavity injection molding system utilizing the noted runner system is described. And, a related method for promoting uniform filling of multiple mold cavities is also disclosed.

9 Claims, 12 Drawing Sheets

APPARATUS FOR MULTIPLE CAVITY INJECTION MOLDING

FIELD OF THE INVENTION

The present invention relates to an apparatus and method for forming molded parts from a polymeric material by injecting the material into a multiple cavity mold. More specifically, the present invention relates to an apparatus and method for promoting uniform flow of polymeric material and uniform filling of all mold cavities in a multiple cavity injection molding apparatus. Another significant aspect of the invention is that it eliminates a requirement of supplemental or external heating of runner systems used in conventional multiple cavity injection molding operations. Moreover, the invention eliminates conventional trial and error methods of adjusting flow parameters in order to achieve uniform filling of multiple molding cavities.

BACKGROUND OF THE INVENTION

Multiple cavity injection molding offers several advantages over single mold cavity injection molding. A significant advantage is the increased number of molded articles produced for every injection molding cycle. Consequently, an increase in the number of parts produced has the potential to increase overall productivity and reduce production costs.

However, potential problems also arise with the use of multiple cavity injection molding. These problems stem from the flow of a polymeric material through the injection molding system. Ideally, the flow and state of the polymeric material is uniform as it travels from a feed source or through a runner system, to each respective mold cavity. However, flow paths or runner systems become increasingly complex as the number of mold cavities increases. This complexity is detrimental for the following reasons. Complex runner systems associated with multiple cavity injection molding may contribute to pressure changes which can alter the flow rate. Temperature changes or variances thereof along such relatively long runner systems may increase the viscosity leading to a reduced flow rate. Premature curing of thermoset polymeric material or solidification of thermoplastic polymeric material can also potentially reduce flow rates and cause eventual blockage of flow.

Such flow problems directly affect the production of molded parts. Cavities that are not sufficiently filled may produce unacceptable parts. As a result, productivity decreases and operating costs may increase in order to produce a desired number of acceptable products.

Nonuniform curing of the molded articles affects the physical characteristics of the articles. Different cure states of a polymer give rise to different physical properties. If the polymer is not in a uniform state as the mold cavities are filled or, if the polymer cures at different rates at various locations within the mold cavities or the runners, there exists a potential that the physical characteristics of the molded articles will vary from part to part. Some characteristics may be undesirable leading to defective molded parts which can not adequately function in a manner for which they were designed.

Conventional multiple cavity injection molding systems generally produce a great deal of scrap. Rejected parts, underfill material, overfill material, flash material and polymer material frozen in runners or gates are not commercializable and thus become scrap. A large amount of scrap typically increases production costs, as more material is required to produce the desired articles. Productivity may also decrease, as longer periods of time are needed to clean and prepare the system between injection cycles.

Various approaches have been employed in an attempt to avoid the problems associated with multiple cavity injection molding. A common approach to ensuring that the polymer is in a proper melt state is the use of thermally insulated or hot runner systems, along with trial and error adjustment of molding conditions such as temperature, pressure, and injection speed.

A means for controlling melt flow and reducing scrap is described in U.S. Pat. No. 5,945,139. An apparatus and method is disclosed in that patent for introducing an uncured thermoset material through a series of runners and into a plurality of cavities. Material in the cavities is allowed to cure and material remaining in the runners is kept live in order to be used in a subsequent injection cycle.

Techniques for ensuring sufficient filling of mold cavities have also been disclosed. These methods may involve devices, which monitor the amount of material supplied to a cavity, such as that described in U.S. Pat. No. 5,149,547.

U.S. Pat. No. 4,120,921 describes a method of sequentially filling mold cavities by supplying ultrasonic energy to a gating device. Material is injected into a cavity to which the ultrasonic energy has been supplied until the cavity is filled. After the material is frozen, ultrasonic energy is supplied sequentially to the gates of the remaining cavities. The material in each cavity is allowed to freeze before energy is supplied to the next gate.

Flow control is addressed in U.S. Pat. No. 5,849,236 which discloses an apparatus employing control members that may be inserted into a conduit to varying degrees to provide balanced flow of thermoplastic material into each of a plurality of cavities.

Although satisfactory in some respects, many of the prior art techniques and equipment used for multiple cavity injection molding fail in varying degrees, to adequately address the problems associated with multiple cavity injection molding. Also, prior art techniques cover thermoset polymeric materials, which employed compression and/or transfer molding methods. In transfer and compression molding procedures, longer periods of time, eg. up to 50 minutes, are afforded for the melt flow to travel to the cavity and for the curing time inside the cavity, whereas thermoplastic polymeric materials can only be afforded relatively short travel and fill times, eg. 5 to 30 seconds. Therefore, external heating devices and ultrasonic methods were found to be costly and ineffective. For instance, external heating of runners or control devices, as discussed in the prior art, involve additional costs in both the design and operation of the molding apparatus.

Accordingly, there still exists a need for an improved approach suitable for remedying at least some of the difficulties associated with multiple cavity injection.

SUMMARY OF THE INVENTION

In one aspect, the present invention provides a multiple cavity injection molding system that remarkably and consistently produces molded parts from injecting molten polymeric material simultaneously into a collection of mold cavities. The system comprises a feed source of molten polymeric material, a collection of mold cavities, a primary sprue for transferring polymeric material from the feed source, and a runner system for distributing the polymeric material from the primary sprue to the collection of mold cavities. The runner system utilizes a unique configuration and at least two turbulence inducing components that maintain a particular shear rate within the polymer as it exits the runner system and enters the mold cavities.

In another aspect, the present invention provides a runner system adapted for multiple cavity injection molding in which the runner system comprises a primary runner, first and second secondary runners, and a plurality of tertiary turbulence inducing runners, arranged in a particular configuration. Upon introducing a flowable material into a feed opening of the primary runner at a pressure sufficient to cause the material to flow through the runner system and exit through exit ports defined in the tertiary turbulence inducing runners, the material while in the tertiary turbulence inducing runners, is in a pseudo-turbulent state.

In a further aspect, the present invention provides a turbulence inducing runner adapted for incorporation in a runner system for a multiple cavity injection molding system. The turbulence inducing runner comprises a primary runner, first and second secondary runners in communication with the primary runner, and a plurality of turbulence inducing steps in communication with the first and second secondary runners.

In yet another aspect, the present invention provides a method for promoting uniform filling of multiple mold cavities. The method comprises a step of providing a collection of runner components, and also selecting at least two turbulence inducing components that are combined with the runners. The method further comprises the step of configuring together the runners and turbulence inducing components in such a manner as to form a runner system having a particular geometry that has been found to maintain a particular shear rate within the polymeric material when flowing through the runner system.

DESCRIPTION OF THE PREFERRED EMBODIMENTS

The present invention will now be described more fully hereinafter. The invention may be embodied in many different forms and should not be construed as limited to the embodiments set forth herein. The embodiments described herein are provided so that this disclosure will be thorough and complete and will fully convey the invention to those skilled in the art.

The term "runner" as used herein generally refers to nearly any pipe, conduit, or channel typically used for transferring flowable materials such as by pumping or gravity flow therethrough. All runners as described herein have a hollow or open interior through which the flowable material may travel.

Figure 1:
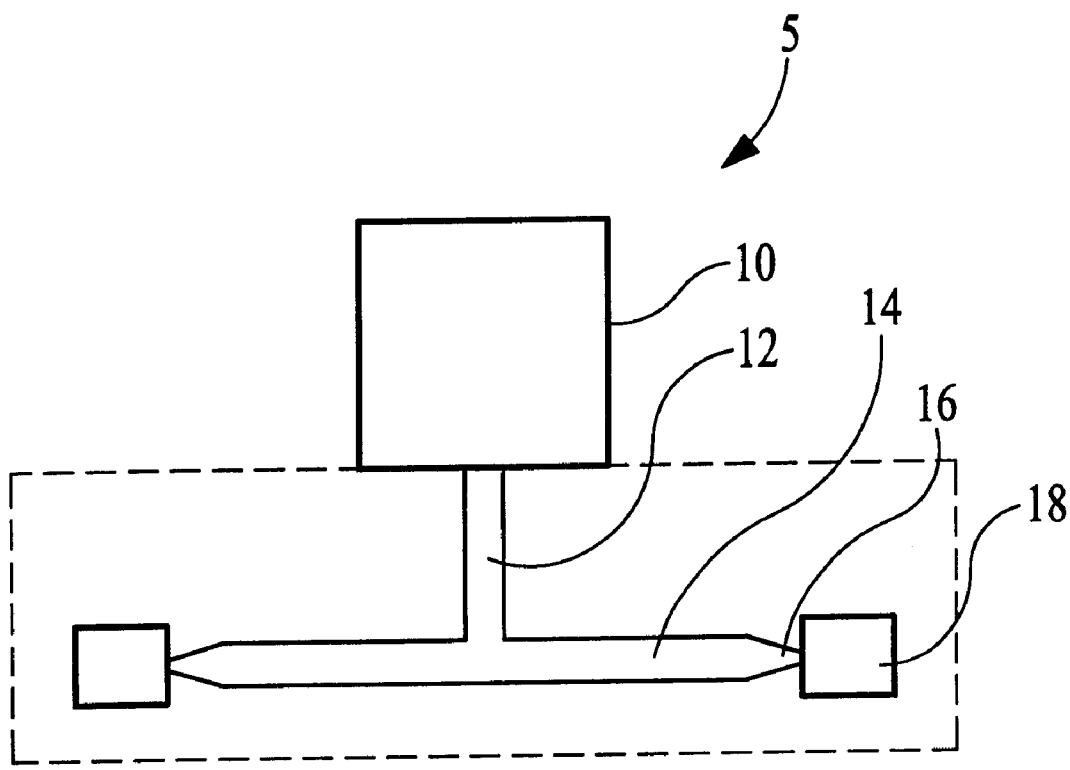
FIG. 1 is a process schematic of a conventional injection molding unit.

FIG. 1 is a schematic of a conventional injection molding system 5 employing two mold cavities. The injection molding system 5 generally comprises an injection unit 10, a main sprue 12 for transfer of flowable molding material to a runner 14, which in turn directs the material to one or more gates 16 and mold cavities 18. Injection unit 10 comprises a source of polymeric material and a transfer or pumping device such as a reciprocating screw. Melted polymer is heated and fed under pressure from injection unit 10 and into the main sprue 12. When the screw turns, the polymeric material is pumped from unit 10 toward sprue 12. Polymer flows through sprue 12 until reaching an opening at the end of sprue 12, which branches into runner 14. Polymer material travels in both directions of runner 14 and through gates 16 at each end of runner 14. The gates are in communication with mold cavities 18. Polymer material flows through the gates and into each respective mold cavity.

A wide array of pressures may be used in an injection molding system. Typically in the case of thermoplastic polymeric molding systems, system pressures are within the range of from about 5000 psi to about 30,000 psi. Polymer material leaves the injection unit 10 typically heated to a temperature of about 400 to 450° F. in the case of ABS polymer. Polymeric material may be heated when fed into the injection unit. Typically, the temperature of the polymeric material increases further as the reciprocating screw turns and forces material into the sprue 12 of the molding system 5. Screw action and injection speed generate shear and subsequently a rise in the temperature of the polymer. The viscosity, or resistance to flow, of the polymeric melt decreases as the temperature rises. The lower the viscosity value of a material, the more readily the material flows. An excessive amount of heat produced from the shear may lead to degradation or breakdown of the polymeric material.

Polymer flow may be analyzed by considering the relationship between the viscosity of the polymer and shear rate imparted to the polymer. Specifically, for most polymeric systems, viscosity is a function of shear rate. Often, such relationship is measured by extruding polymer through a fixed orifice at different shear rates. Table 1 shows the effects of shear rate on viscosity for an acrylonitrile-butadiene-styrene terpolymer (ABS) and a polyphenylene oxide and polystyrene blend glass filled polymer.

TABLE 1

Effect of Shear Rate on Dynamic Viscosity

| Shear Rate (1/second) | Dynamic Viscosity (poise) ABS polymer | Dynamic Viscosity (poise) Polyphenylene oxide/polystyrene blend (20% glass filled) |
| --- | --- | --- |
| 1 | $1 \times 10^5$ | $1 \times 10^6$ |
| 10 | $9 \times 10^4$ | $4 \times 10^5$ |
| 100 | $2.5 \times 10^4$ | $0.5 \times 10^5$ |
| 1000 | $0.5 \times 10^4$ | $3 \times 10^4$ |

Table 1 shows that increasing the shear rate generally reduces the viscosity value of a polymeric material, thereby yielding a more flowable material.

Referring to FIG. 1 again, the problems associated with conventional injection molding systems, and particularly those using multiple mold cavities, will now be described.

After traveling through the runner system, e.g., sprue 12 and runner 14, the polymer contacts "cold" mold cavities 18 having a temperature of about 100° F. The large decrease in temperature of about 350° F. causes a severe reduction in the flowability of the polymeric material. Accordingly, the viscosity value of the polymer increases dramatically. An increase in the viscosity value indicates the material having reduced flowability. The dramatic increase in viscosity value of the polymeric material therefore produces a front-end flow that is essentially frozen. As a result, the flow speed of polymeric material throughout the runner system is greatly reduced. The polymer does not flow through the runners at the same rate and the front end of the flow does not reach the cavities at the same rate. Another consequence of reduced viscosity or frozen front end flow is block flow in which the polymeric material is otherwise restricted from flowing to a desired cavity. Both occurrences greatly increase the likelihood that mold cavities will be insufficiently filled. Insufficient filling of mold cavities is not desirable because unacceptable or defective molded parts are produced by such cavities.

Additionally, pressure changes throughout, or variances across, a runner system contribute to reduced or non-uniform flow. Comparing the pressure at a first location in a runner system to the pressure at a second location, downstream from the first location during a molding operation, there will be, by definition, a pressure drop across the runner from the first to the second location. Such pressure differential, as will be appreciated, causes flow of material between these locations. In a typical runner system utilized in a conventional injection molding system, the pressure drop is usually about 1200 psi across primary runners, about 850 psi across secondary runners, and about 400 psi across tertiary runners. Examples of primary, secondary, and tertiary runners are provided herein in conjunction with the description of the preferred embodiment turbulence inducing runners and systems utilizing such. As will be further understood by those skilled in the art, the amount of a pressure drop may vary according to runner size and length and other variables.

Complex runner systems, such as those used for multiple cavity injection molding systems, typically exhibit an array of pressure variances within different regions of the system. These pressure variances lead to differing pressure drops across similar regions of the system, which in turn lead to differences in flow rate and flow rate fluctuations. A reduction in pressure drop causes the polymer melt travel speed to decrease, thereby reducing the melt front temperature and increasing non-mixing or "pseudo-laminar" flow behavior in the polymeric material to the point that flow is almost stagnant. These aspects are discussed in greater detail herein. Consequently, the speed at which the polymer melt front reaches the gates and cavities varies, which may result in a failure to sufficiently fill all the mold cavities.

In terms of shear rate, in a conventional injection system, a polymeric material may experience a shear rate of about 8000 (1/sec) in a feed line or sprue, but after entering a first branched line, may experience a significant reduction in shear rate, for instance to about 4000 (1/sec). It will be recalled that for most polymeric materials, as the shear rate decreases, the viscosity increases. As the flowing polymeric material travels through a series of branches or split flows, the shear rate continues to drop. Accordingly, the viscosity further increases. This phenomenon is further compounded by the previously noted reductions in temperature and pressure drop across the runner system.

The present invention is based on the discovery that by promoting turbulence in the polymer material in a specific manner as the material is administered to a plurality of mold cavities, the noted flow problems may be avoided or at least significantly reduced. More specifically, by particularly agitating or forcing polymeric material through runners, sprues, nozzles etc., continuous action or turbulent mixing of the material occurs at least at the polymer melt front if not throughout the entire flow path.

Polymer melt viscosities, as measured by pressure, were compared in an injection molding system that did not employ the present invention and also in an injection molding system that did utilize the present invention. A monitoring device, manufactured by RJG Technology, Inc., was used to measure the pressure changes inside an injection unit. Pressure transducers were installed at the gate entrance (post gate pressure) and the end of the cavity (end of fill pressure). The injection molding system pressure was measure by monitoring the hydraulic pressure, which represents the total injection pressure exerted on the molding operation.

Table 2 compares the system pressures of an injection molding unit that does not utilize a turbulence inducing system of the present invention, to an injection unit that does employ a turbulence inducing system of the present invention. The data was obtained from an ABS injection molding system. The values would be expected to change for other polymers and molding parameters.

TABLE 2

Effect of Turbulence Inducer on Viscosity

| System Parameter | Injection Unit Without Turbulence Inducer | Injection Unit With Turbulence Inducer |
| --- | --- | --- |
| Hydraulic Pressure | 13,340 psi | 13,430 psi |
| Post Gate Pressure | 4112 psi | 4110 psi |
| End of Fill Pressure | *3500 psi | 3470 psi |

*Due to underfill, end of fill pressure was not always detected.

Table 2 demonstrates that an injection molding system employing a turbulence inducing system exhibits pressures comparable to an injection molding system without a turbulence inducing system of the present invention. Because melt flow viscosity may be viewed as a measure of pressure, Table 2 demonstrates that the present invention turbulence inducer does not significantly alter the polymer melt viscosity, but rather allows the melt viscosity of the polymer to be maintained all the way along the flow path.

The "pseudo-turbulent" flow created by the present invention serves to "refresh" the polymer melt by shear heating. Thus the present invention device and/or system changes the flow characteristics of the polymer material such that it appears the viscosity has been reduced, i.e. the polymer is more flowable.

Table 3, set forth below, lists typical melt temperatures and mold temperatures for other polymeric systems.

TABLE 3

Examples of Melt Temperatures of some Polymers for Injection Molding

| | Melt Temperatures, ° F. | Mold Temperature, ° F. |
|---|---|---|
| Acrylonitrile-Butadiene-Styrene (ABS) Terpolymer | 380–500 | 120–160 |
| Polycarbonate (PC) | 510–600 | 180–240 |
| ABS/PC Blend | 410–525 | 120–180 |
| Poly(butyleneterephthalate) (PBT) | 440–500 | 160–190 |
| Polyamide (Nylon) | 480–570 | 100–200 |
| Poly(phenylene oxide)/polystyrene Blend | 450–520 | 150–180 |

Molten polymer has a high viscosity value compared with most other fluids. Turbulence creates a shear force, or rather increases shear force, which for most polymeric materials, results in increased flowability of the material. The increased shear force may also generate an increase in temperature in the polymeric material. The temperature rise leads to a further decrease in the viscosity value, producing more flowable and fresher polymeric material. Thus, the present invention is directed toward providing a "pseudo-turbulent" melt front to reactivate or rejuvenate the front end of the flow, thereby serving to equalize and promote polymeric flow to each mold cavity. As previously noted, in the absence of such mixing or agitation, the material exhibits a non-mixing or "pseudo-laminar" flow. Although conventional flow terminology such as "turbulence" and "laminar" is not particularly applicable in describing the flow of most polymeric materials, these terms are used herein to denote the respective states of flow. Restated, although a polymeric material in a pseudo-turbulent state may not necessarily exhibit a Reynolds Number of greater than about 2000, eg. the Reynolds Number being a traditional indicator of fluid states being laminar or turbulent, the material will exhibit properties and characteristics similar to a turbulent state. For instance, polymeric flow in a pseudo-turbulent state according to the present invention exhibits relatively high degrees of mixing and agitation as compared to the flow in a pseudo-laminar state. It is believed that the lines of flow of polymeric material in a pseudo-turbulent state resemble the flow lines of a conventional liquid in a state of turbulence and thereby having a Reynolds Number of greater than about 2000.

The present invention provides a turbulence inducing runner that may be directly incorporated in a runner system in a multiple cavity injection molding system. The runner is designed to mix and tumble polymeric material flowing therethrough, thereby generating a "pseudo-turbulent" melt front. The turbulence inducing runner and its particular geometry and configuration described herein, and the incorporation of turbulence inducing steps as described herein, are all aspects of the present invention which enable pseudo-turbulence to be maintained throughout an injection system. At a minimum, these aspects result in a turbulent state of the liquid or flowable material as it exits the runner system and is introduced into a mold cavity.

The preferred embodiment turbulence inducing runners as described herein cause or impart pseudo-turbulent flow to the polymeric material flowing through the runners. Such mixing creates a shear force within the material that contributes to an apparent reduction in the viscosity of the polymeric material thereby creating a refreshing melt front all the way to the mold cavities, as if the viscosity of the material were reduced. A refreshed melt front promotes an equalized flow of polymer throughout a runner system.

Figure 2:
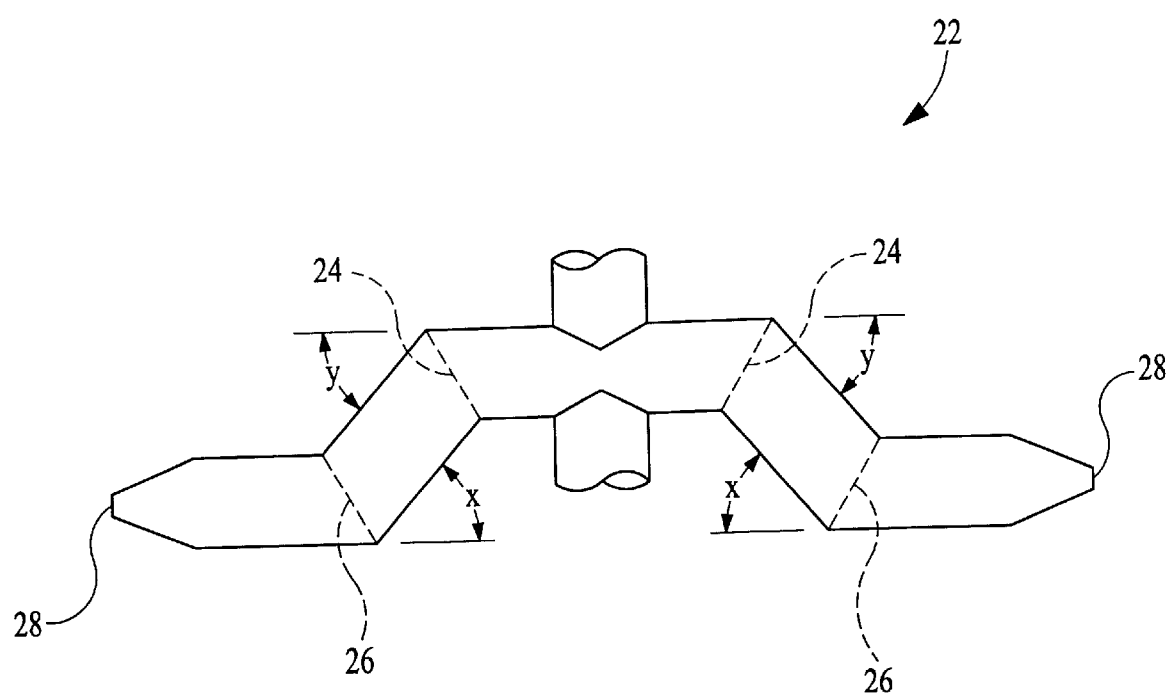
FIG. 2 is an illustration of a first preferred embodiment turbulence inducing runner in accordance with the present invention.

FIG. 2 depicts, in schematic form, a preferred embodiment turbulence inducing runner 22 according to the present invention. It will be understood that FIG. 2 and all other figures referenced herein are in schematic form and not necessarily to scale. Turbulence inducing runner 22 provides turbulence inducing steps 24 and 26, which serve to agitate and mix the polymeric material flowing therethrough. Polymeric material enters the runner 22 through a port or entrance between the opposing pairs of steps 24. Polymer material that flows through turbulence inducing runner 22 is agitated and mixed by turbulence inducing steps 24 and 26 and continues to flow to openings 28. Each opening 28 preferably leads to a gate (not shown) which communicates with a mold cavity (not shown).

The first preferred embodiment runner 22 employs two turbulence inducing steps 24 and 26. There is no specific limit regarding the number of steps employed by the preferred embodiment turbulence inducing runners. The primary limiting factor with regard to the number of steps employed in a turbulence inducing runner is the overall turbulence produced by a runner. Preferably, a turbulence inducing runner in accordance with the present invention should impart a shear force and induce turbulence in the polymer, i.e. mix and agitate the polymer, such that an increase in the viscosity of the polymeric material does not occur, as compared to the original melt viscosity, as the polymeric material enters a runner from a nozzle. Therefore, the polymeric material more readily flows to a mold cavity downstream, but not to such a degree that the shear force and turbulence lead to excessive energy losses or generate an excessive temperature rise that leads to a breakdown of the polymeric material.

A turbulence inducing runner according to the present invention preferably comprises one or more turbulence inducing angles. These are illustrated in FIG. 2 as angles x and y. As will be appreciated, turbulence inducing angles may result from turbulence inducing steps, i.e. turbulence inducing angle x results from turbulence inducing step 26. The turbulence inducing angles agitate and mix the polymeric material, which as previously explained, promote flowability of the polymeric material and generally offset the noted detrimental viscosity altering effects, thereby allowing the viscosity of the polymer to be maintained. No limitation is placed on the shape or curvature of the turbulence inducing angles. Turbulence inducing angles are preferably rounded or linear, eg. sharp at the region at which the direction of flow changes. Additionally, turbulence inducing angles may be stepped i.e., in the form of a series of continuous curves of varying angles. No limit is placed on the magnitude of a given angle. Preferably, turbulence inducing angles are less than or equal to 90° and more preferably, turbulence inducing angles are within the range of from about 30° to about 60°. No limit is placed on the number of turbulence inducing angles employed in a turbulence inducing runner. It is preferred, however, that the turbulence inducing runner be symmetrical, which is described in greater detail herein. The preferred symmetrical configuration of the runner dictates that the total number of turbulence inducing angles in the runner be an even number. It is also preferred that the sum of angles of all turbulence inducing angles in a turbulence inducing runner is 90° or a multiple thereof, such as 180°, 270°, or 360°.

Figure 3:
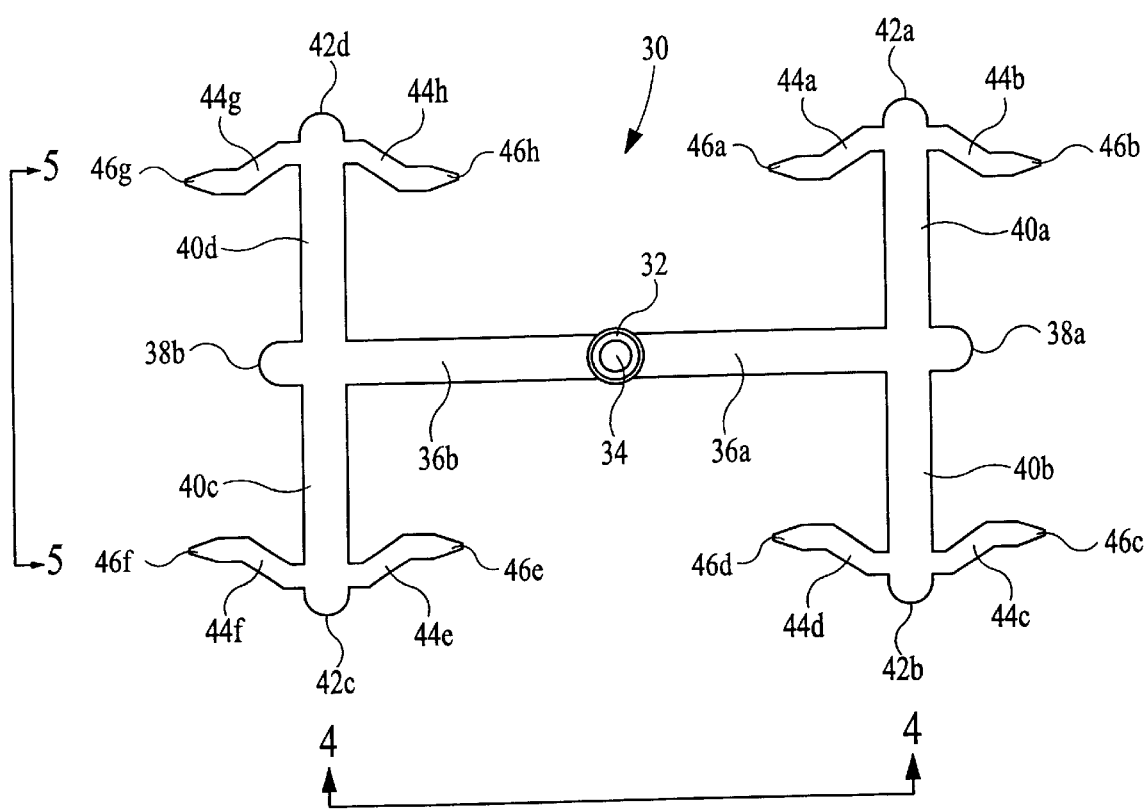
FIG. 3 is a top view of a runner system employing a plurality of turbulence inducing runners of the first preferred embodiment.

FIGS. 3–6 illustrate aspects relating to a first preferred embodiment injection molding runner system utilizing a plurality of the first preferred embodiment turbulence inducing runners of the present invention. In FIG. 3 the preferred embodiment runner system 30 is viewed from the top i.e., the viewer is looking down on the runner system. Flowable polymer material such as from a feed source (not shown), is forced under pressure into sprue 32 which defines a sprue channel 34, and into primary runner 36. Primary runner 36 branches off of sprue 32. Polymer material travels through sprue 32 and into branches 36a and 36b of runner 36. Runners 36a and 36b are equivalent to one another and herein are referred to collectively as primary runner 36.

As shown in FIG. 3, disposed at each end of runner 36 is one or more secondary runners 40. Preferably, each secondary runner 40 branches off of primary runner 36. Runners 40a and 40b branch off of runner 36a, and runners 40c and 40d branch off of runner 36b. Runners 40a–d are equivalent to one another and herein are referred to collectively as secondary runner 40. The runner system 30 depicted in FIG. 3 utilizes one primary runner 36 and two secondary runners 40 disposed at opposite ends of the primary runner 36. The polymer flows through primary runner 36 until reaching openings leading to secondary runner 40 wherein the polymer can flow into runner 40. At the same time, some of the polymer may flow through the openings and into an extension of runner 36 at which it will encounter a curved end region 38. Curved end regions 38a and 38b are located at the end of runners 36a and 36b, respectively. Curved end regions 38a and 38b are equivalent to one another and herein are referred to collectively as curved end region 38. Curved end region 38 redirects the polymer into runner 40. Although the runner system 30 shown in FIG. 3 utilizes curved end regions, it is not necessary that such systems employ these curved end regions. Clearly, runner systems in accordance with the present invention may avoid the use of curved end regions.

Disposed at the open ends of runner 40 are a corresponding number of preferred embodiment turbulence inducing runners in accordance with the present invention. As shown in FIG. 3, four of the preferred embodiment turbulence inducing runners, such as runner 22 shown in FIG. 2, are utilized in the runner system 30. These are designated in FIG. 3 as runner 44. The preferred embodiment turbulence inducing runners are incorporated into the runner system 30 such that the turbulence inducing runners constitute tertiary runners. That is, they are located downstream from primary and secondary runners. Hence, the preferred embodiment turbulence inducing runners are referred to as tertiary runners 44 upon incorporation in the runner system 30 depicted in FIG. 3.

Specifically, the runner system according to FIG. 3 shows tertiary turbulence inducing runners 44a and 44b branching off of secondary runner 40a. Tertiary runners 44c and 44d branch off of secondary runner 40b. Tertiary runners 44e and 44f branch off of secondary runner 40c. And, tertiary runners 44g and 44h branch off of secondary runner 40d. Tertiary turbulence inducing runners 44a–h are equivalent to one another and herein are referred to collectively as tertiary runner 44. The runner system 30 illustrated in FIG. 3 utilizes four tertiary runners 44. Tertiary turbulence inducing runner 44 provides a series of turbulence inducing steps and angles that serve to agitate, mix, and induce turbulence in the polymeric material. Additionally, a curved end region is encountered at the end of each member of secondary runner 40. Thus curved end region 42a forms the end of runner 40a, curved end region 42b forms the end of runner 40b, curved end region 42c forms the end of runner 40c, and curved end region 42d forms the end of runner 40d. Curved end regions 42a–d are equivalent to one another and herein are referred to collectively as curved end regions 42. As polymer flows through secondary runner 40, curved end region 42 redirects the polymer flow into tertiary runner 44.

An opening or exit port 46 is located at each end of runner 44, leading to a gate (not shown) which communicates with a mold cavity (not shown). Openings 46a–h are located at the end of runners 44a–h, respectively. Openings 46a–h are equivalent to one another and herein are referred to collectively as opening 46. Tertiary runner 44 provides a series of turbulence promoting bends causing the polymer to change direction and be agitated as it flows through opening 46, into a gate and eventually into a mold cavity.

As previously explained, inducing turbulence in the polymer produces a shear force that promotes flowability of polymeric material. An increase in shear force also tends to increase the internal temperature of the polymer. This promotes the polymer to remain "fresh." More specifically, such induced turbulence results in the leading region or front end of the polymer to be continuously reactivated or rejuvenated. Thus, the polymer generally maintains its viscosity or flowability thereby promoting an equal flow of the polymer to all mold cavities.

Figure 4:
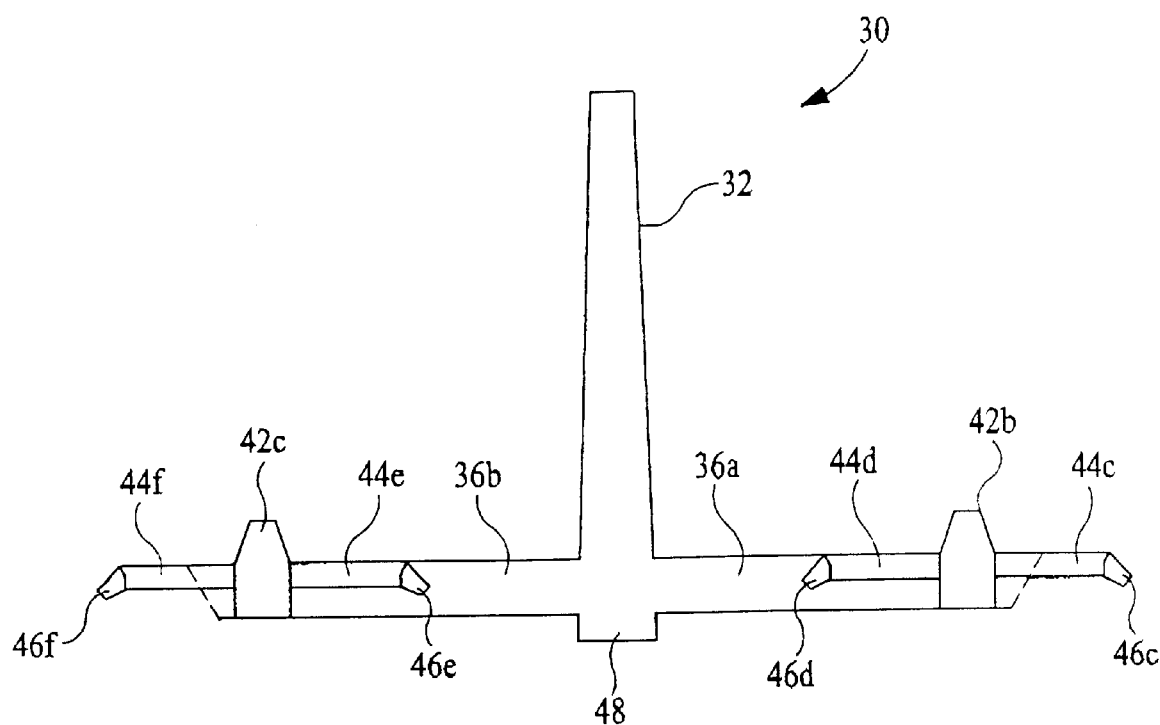
FIG. 4 is a side view of the runner system employing a turbulence inducing runner of the first preferred embodiment taken along plane 4—4 in FIG. 3.
Figure 5:
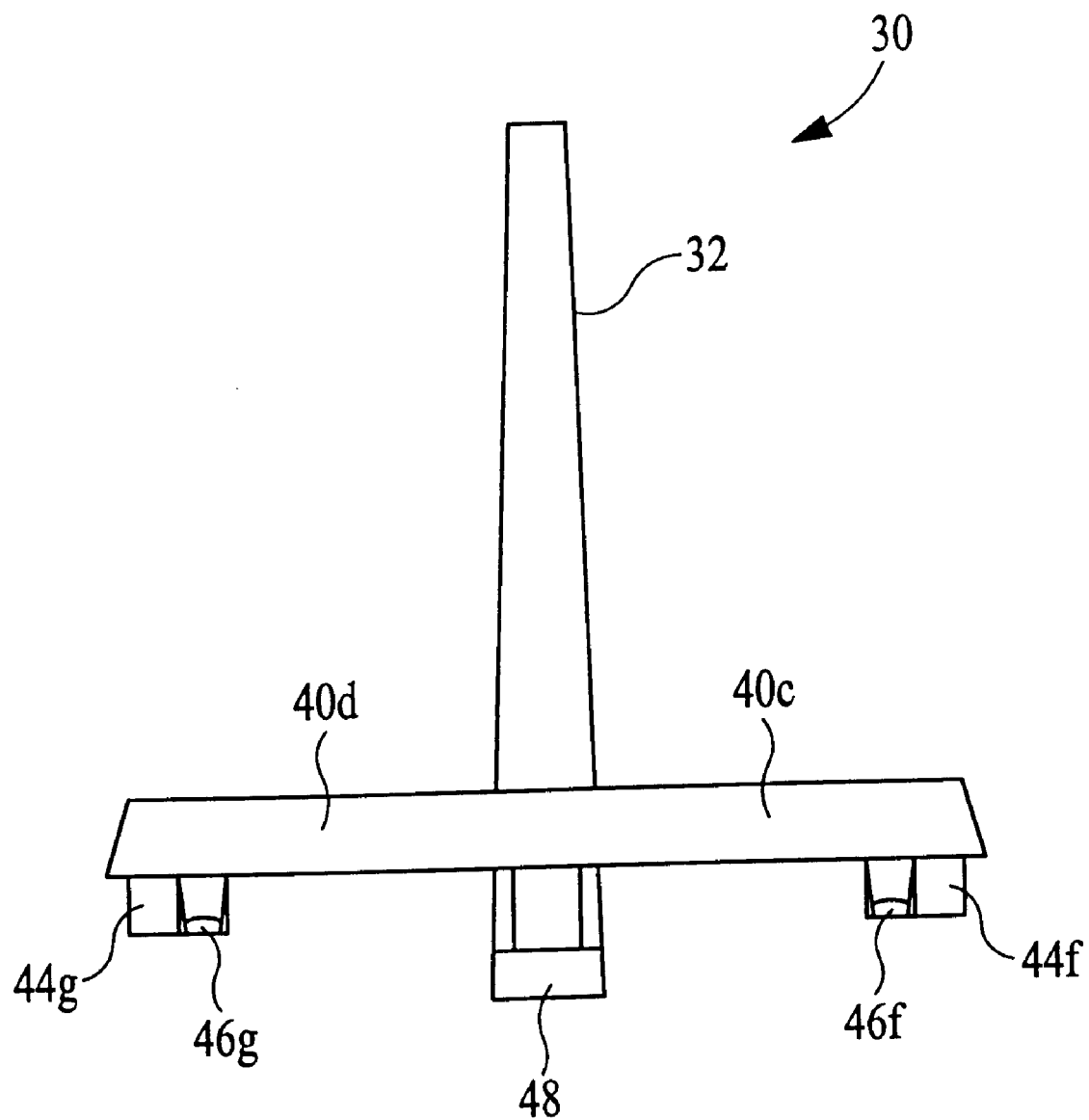
FIG. 5 is an end view of the runner system employing a turbulence inducing runner of the first preferred embodiment taken along plane 5—5 in FIG. 3.

FIGS. 4 and 5 illustrate the runner system 30 when viewed in different planes. These figures show the relationship of sprue 32 to the runner system 30. These figures also illustrate extension 48 of sprue 32. Extension 48 serves as a stepped portion. Namely, the polymer flowing through sprue channel 32 may flow directly into runner 36 or may flow through and past the end of the runner 36 where it encounters stepped portion 48. The stepped portion 48 serves to mix and redirect the polymer back into runner 36.

Figure 6:
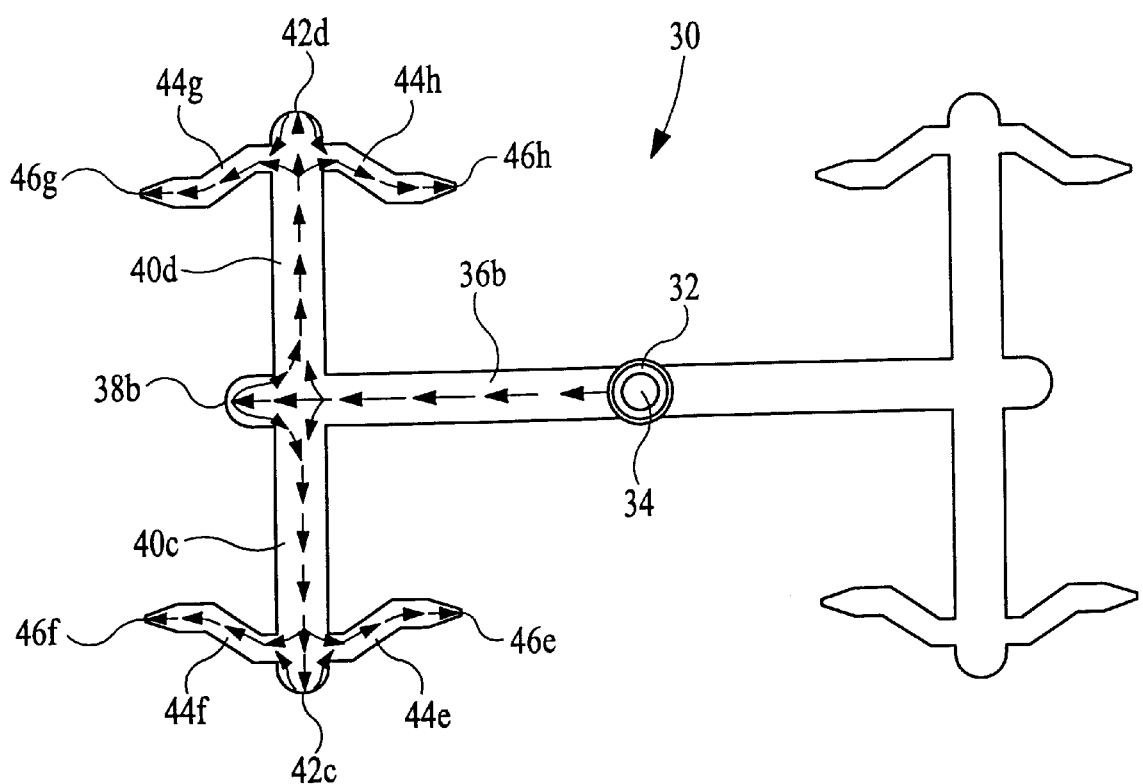
FIG. 6 is a top view of the runner system employing a turbulence inducing runner of the first preferred embodiment depicting polymer flow through a portion of the system.

FIG. 6 illustrates flow of polymer through a portion of the runner system 30 of the first preferred embodiment. After leaving sprue channel 34 the polymer flows into primary runner 36. From runner 36, a portion of the polymer branches into secondary runner 40 and another portion flows into curved end region 38. The polymer flowing into curved end region 38 is redirected toward secondary runner 40 and mixed with polymer flowing from primary runner 36 into secondary runner 40. Material flows through runner 40 until reaching the point at which it may branch off and flow into tertiary runner 44 or to another curved end region 42. Material flowing to curved end region 42 is redirected to tertiary turbulence inducing runner 44. The material is agitated and subsequently mixed with material flowing directly from secondary runner 40 into tertiary turbulence inducing runner 44. Tertiary turbulence inducing runner 44 comprises a series of bends that redirect and mix the polymer as it travels toward opening 46. Opening 46 leads to and is in communication with, a gate (not shown) which gate is in communication with a mold cavity (not shown). Accordingly, polymer material flows through opening 46 into the gate and then fills a mold cavity.

An injection molding runner system utilizing one or more turbulence inducing runners of the present invention, preferably employs a balanced configuration. The term "balanced configuration" as used herein refers to a runner system comprising one or more turbulence inducing runners, in which the runner system utilizes an arrangement of runners, conduits, or flow channels such that the physical properties and flow characteristics of polymeric material exiting the system through exit openings or ports, are equivalent, as measured at each of the exits. Typically, this aspect is accomplished by utilizing similar or equivalent flow paths between each individual exit opening and the main or primary sprue that supplies polymeric material to the runner system. Similar or equivalent flow paths may be realized by using similar geometrical configurations and dimensions for the various runners constituting each flow path from a main sprue to each of the exit ports.

The previously described balanced configuration is preferably symmetrical. The term "symmetrical" as used herein refers to a balanced runner system, as previously described, with an additional feature that the arrangement of runners, conduits, and/or flow channels is symmetrical with respect to a single plane bisecting the runner system through the feed sprue and perpendicular to the plane in which the runners, conduits, and flow channels primarily extend. Accordingly, it is preferred that the various groups of runners, eg. the primary, secondary, and tertiary runners, in a runner system be oriented perpendicular to each other. Referring to FIG. 3, this symmetrical aspect will be further described. The runner system 30 is symmetrical with respect to a plane bisecting the runner system through sprue 32 and perpendicular to either or both planes 4—4 and 5—5. Such symmetry is evident when the bisecting plane, passing through sprue 32, is parallel to secondary runners 40. Such symmetry is also evident if the bisecting plane, passing through sprue 32, also bisects primary runner 36.

More preferably, the balanced configuration is a mirror image arrangement. The term "mirror image arrangement" as used herein refers to a balanced configuration that is symmetrical, and which exhibits a feature of additional symmetry. In a mirror image arrangement, the arrangement of runners, conduits, and/or flow channels is symmetrical with respect to not only one plane, but two planes. The arrangement is symmetrical with respect to a first plane bisecting the runner system through a feed sprue (or other source) and perpendicular to the plane in which the runners, conduits, and flow channels primarily extend. The arrangement is also symmetrical with respect to a second plane that bisects the runner system through the feed sprue and which is perpendicular to both the first plane and the plane in which the runners, conduits, and flow channels primarily extend. Referring to FIG. 3, that runner system 30 not only exhibits a symmetrical configuration, but also a mirror image configuration. Specifically, the runner system 30 exhibits a mirror image configuration since the system 30 is symmetrical with respect to (i) a plane bisecting sprue 32, perpendicular to planes 4—4 and/or 5—5, and parallel to runners 40; and (ii) a plane bisecting sprue 32 and runner 36, and perpendicular to planes 4—4 and/or 5—5.

Employing a balanced configuration, preferably a symmetrical configuration, and most preferably, a mirror image configuration, promotes the likelihood that a polymer material at any given location in the system is in the same physical state and/or is subject to forces equal to those in an equivalent location within the runner system. This leads to uniform flow.

Figure 7:
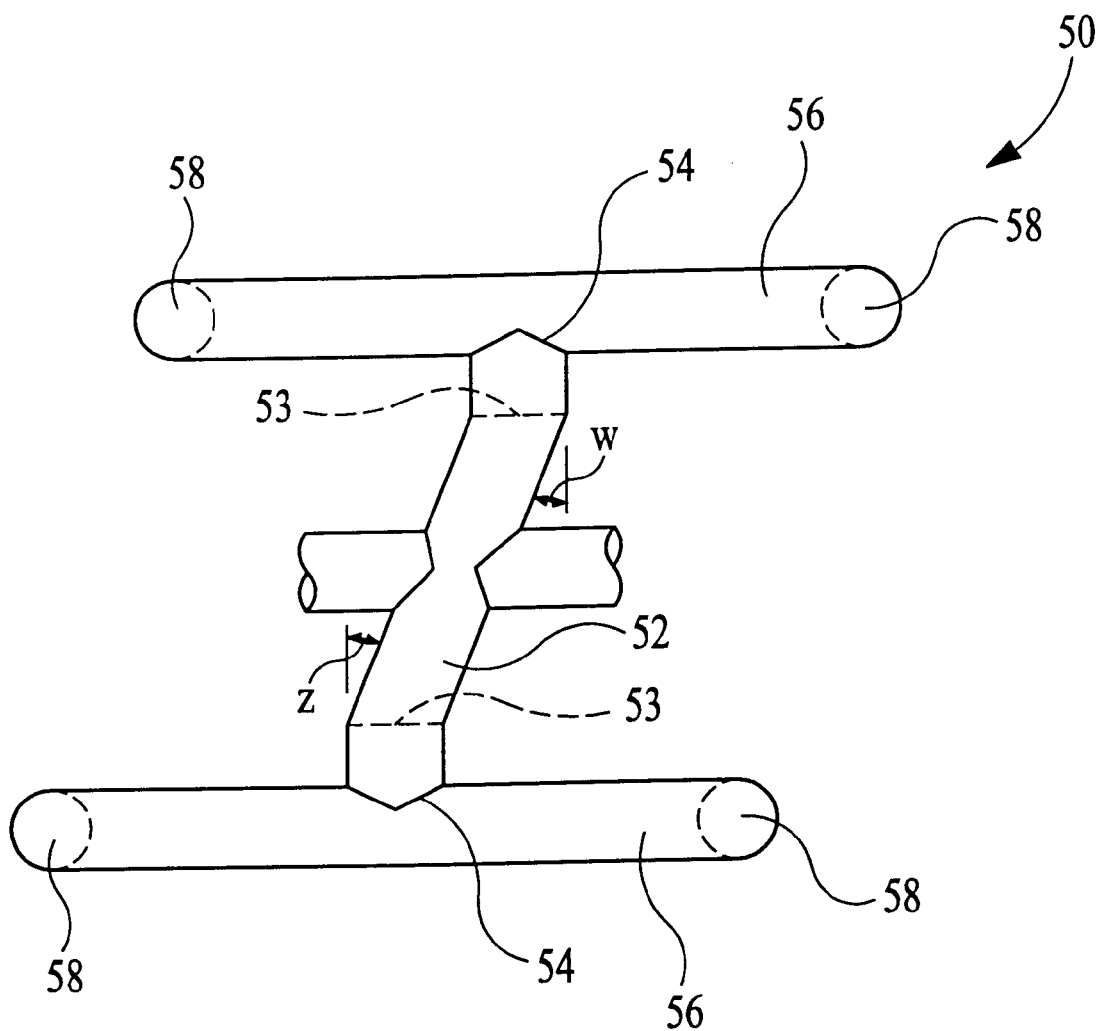
FIG. 7 is an illustration of a second preferred embodiment of a turbulence inducing runner according to the present invention.

A second preferred embodiment turbulence inducing runner 50 is illustrated in FIG. 7. In this embodiment, the turbulence inducing runner provides a plurality of turbulence inducing angles, in conjunction with one or more turbulence inducing steps. The turbulence inducing steps and angles effect a change in the direction of flow of liquid material passing through that particular region of the turbulence inducing runner. The turbulence inducing runner system 50 comprises a first runner 52. The first runner 52 utilizes a pair of turbulence inducing steps 53 and corresponding turbulence inducing angles w and z. The first runner 52 is in communication with two runners 56 via openings 54 in the opposite ends of the runner 52. Each runner 56 preferably provides at least one turbulence inducing step 58 as the material flows through runner 56. Polymeric material flows through runner 56 and towards turbulence inducing steps 58. Polymeric material flows through the turbulence inducing steps 58 and is agitated and mixed as it flows into another runner (not shown). A more detailed description of the second preferred embodiment turbulence inducing runner 50 and steps 58 is provided as it relates to an injection molding runner system comprising such.

Figure 11:
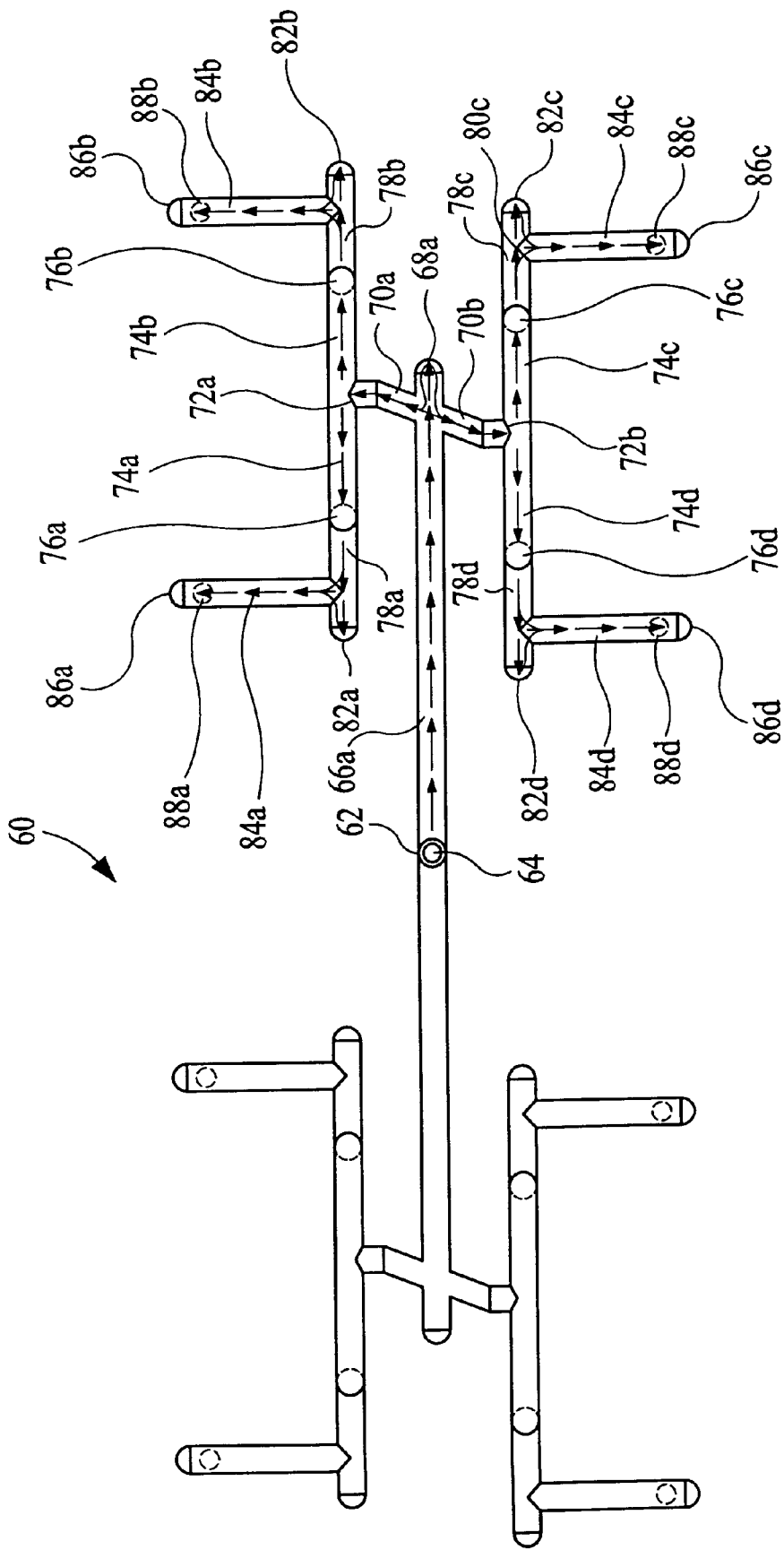
FIG. 11 is a top view of the runner system of FIG. 8 employing a turbulence inducing runner of the second preferred embodiment depicting polymer flow through a portion of the system.
Figure 12:
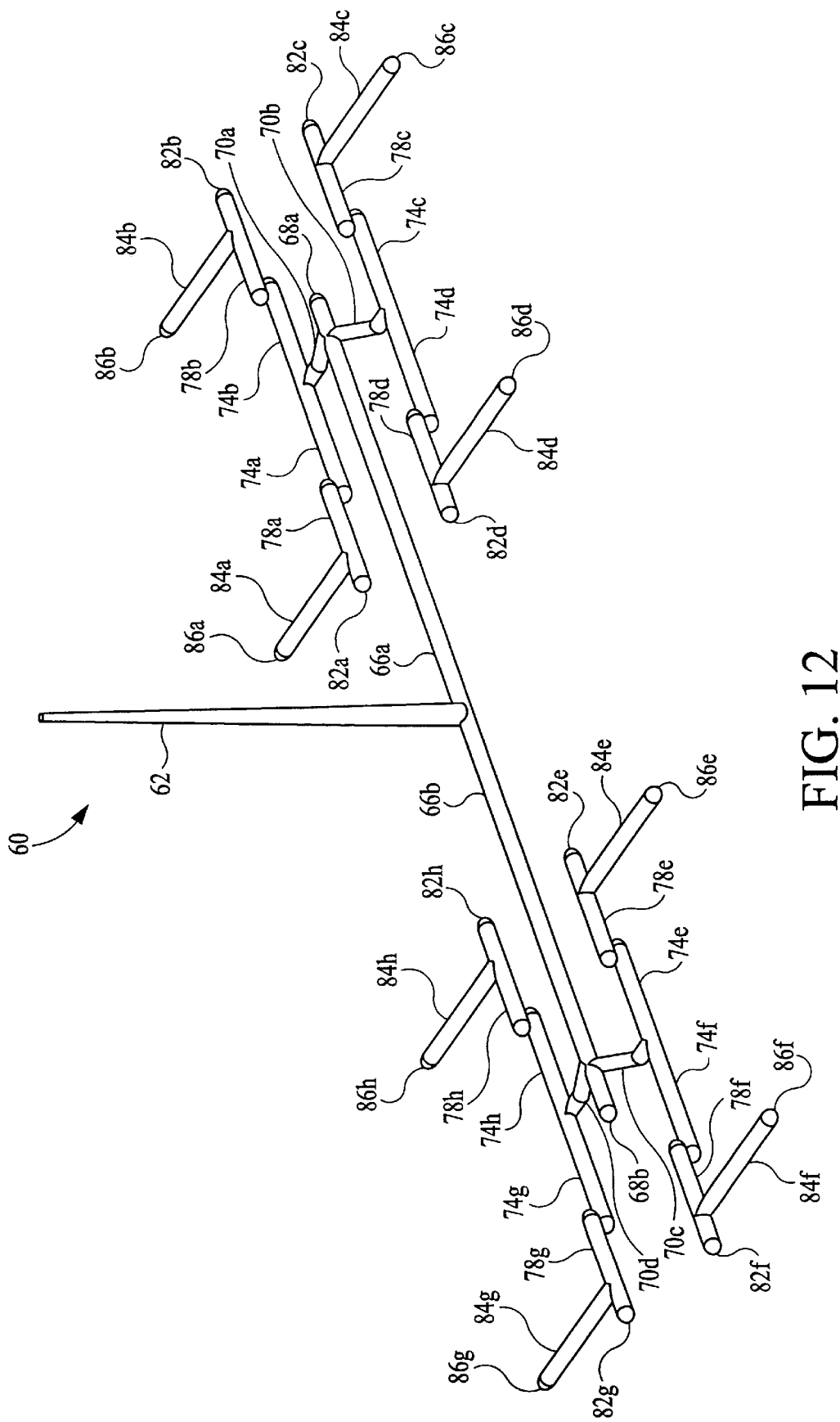
FIG. 12 is a perspective view of the runner system illustrated in FIG. 8.

A runner system 60 employing the second preferred embodiment turbulence inducing runner 50 is illustrated in FIGS. 8–12. Runner system 60 employs a balanced symmetrical configuration. FIG. 11 illustrates the flow path of polymer material through a portion of the runner system 60. Referring to FIGS. 8–12, polymer material is forced under pressure into sprue 62, and through sprue channel 64. Primary runner 66 branches off of sprue 62. Polymer material travels through sprue channel 64 and into branches 66a and 66b of primary runner 66. Runners 66a and 66b are equivalent to one another and herein are referred to collectively as runner 66.

A secondary runner system 70 branches off of primary runner 66. Secondary runners 70a and 70b branch off of primary runner 66a. Secondary runners 70c and 70d branch off of primary runner 66b. Runners 70a–d are equivalent to one another and herein are referred to collectively as runner 70. Polymer flows through primary runner 66 until reaching openings leading to secondary runner 70 wherein polymer material may flow into runner 70. Some of the polymer material may flow into curved end regions 68 at the end of runner 66. Each end of runner 66 is provided with a curved end region 68. Curved end region 68a is located at the end of runner 66a. Curved end region 68b is located at the end of runner 66b. Curved end regions 68a–b are equivalent to one another and herein are referred to collectively as curved end regions 68. These regions redirect the polymer back towards secondary runner 70. As previously noted, these regions are optional for the runner system.

At the end of each secondary runner 70 there is an opening 72 leading to a branched tertiary runner 74. Openings 72a, 72b, 72c and 72d are defined at the end of runners 70a, 70b, 70c and 70d, respectively. Openings 72a–d are equivalent to one another and herein are referred to collectively as opening 72. Opening 72a leads to tertiary runners 74a and 74b. Opening 72b leads to tertiary runners 74c and 74d. Opening 72c leads to tertiary runners 74e and 74f. Opening 72d leads to tertiary runners 74g and 74h. Tertiary runners 74a–h are equivalent to one another and herein are referred to collectively as tertiary runner 74. Polymer material flows through secondary runner 70 into opening 72 and into tertiary runner 74.

Secondary runner 70 of the runner system 60 preferably comprises stepped turbulence inducing angles, providing agitation and mixing of the polymer. The stepped turbulence inducing angles defined along secondary runner 70 correspond to turbulence inducing steps 53 and turbulence inducing angles w and z illustrated in FIG. 7. Secondary runner 70 preferably extends between the plane in which primary runner 66 and the plane in which tertiary runner 74 extends. These planes are described in greater detail below.

Figure 8:
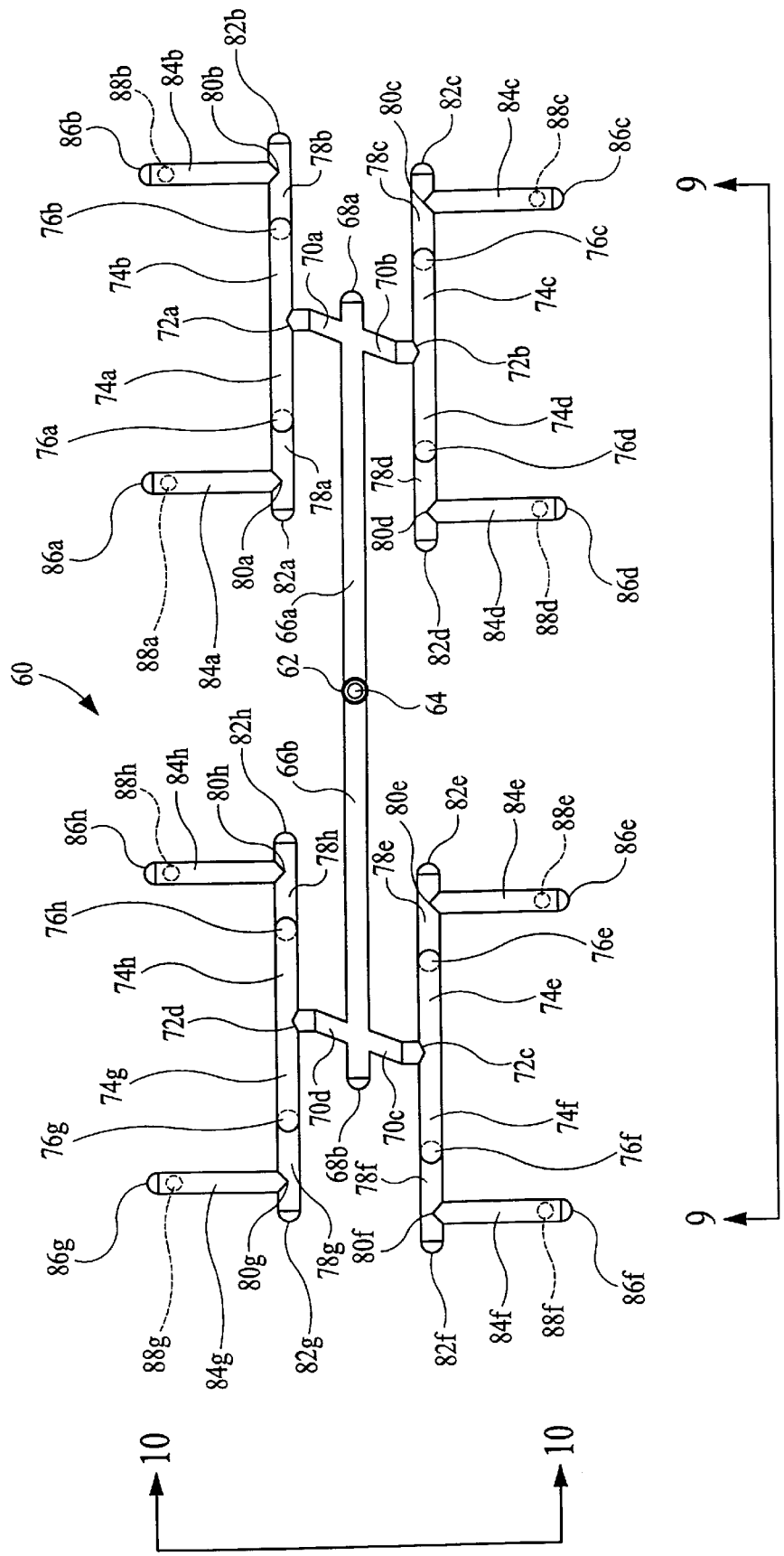
FIG. 8 is a top view of a runner system employing a plurality of turbulence inducing runners of the second preferred embodiment.
Figure 9:
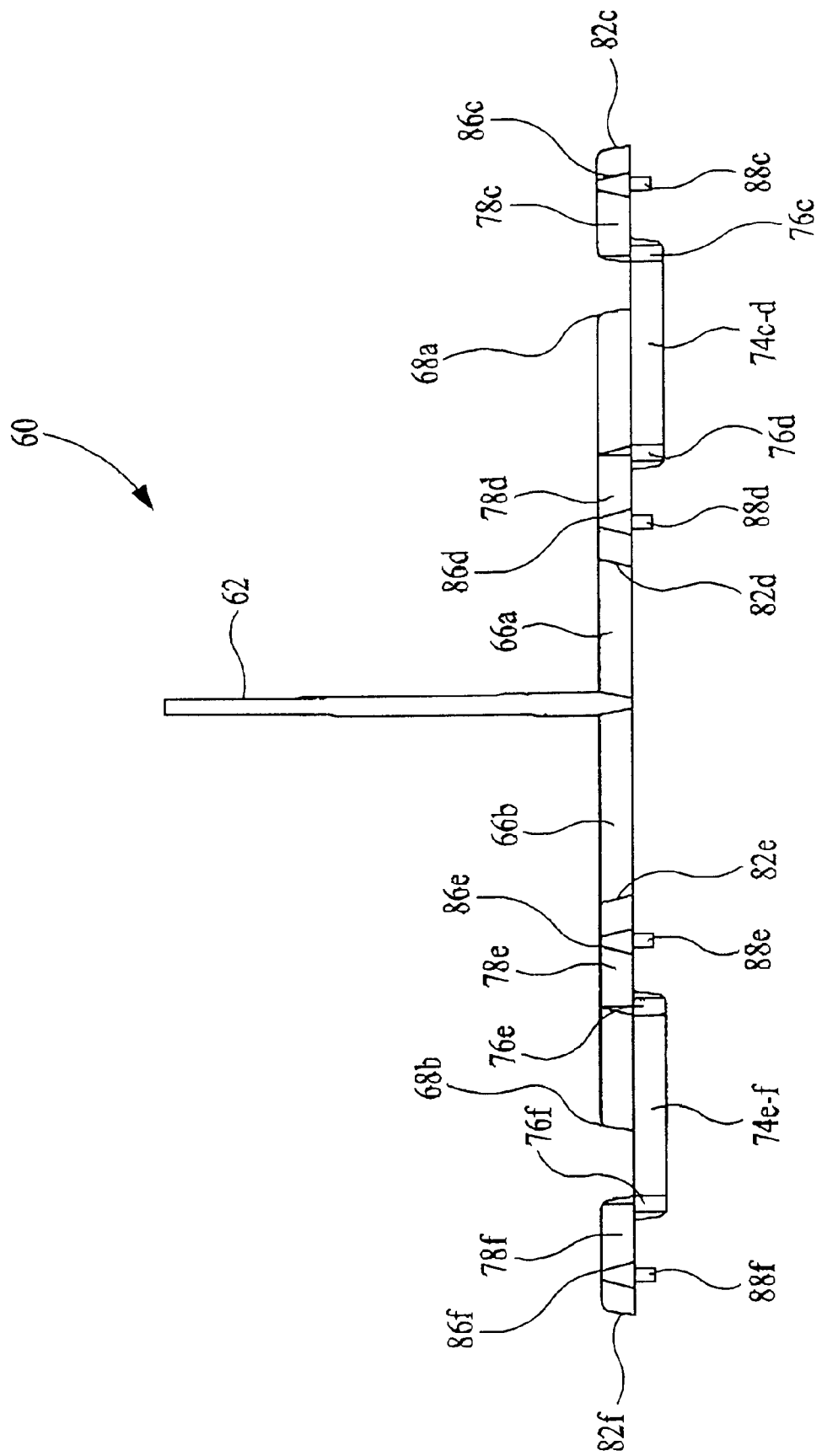
FIG. 9 is a side view of the runner system employing a turbulence inducing runner of the second preferred embodiment taken along plane 9—9 in FIG. 8.
Figure 10:
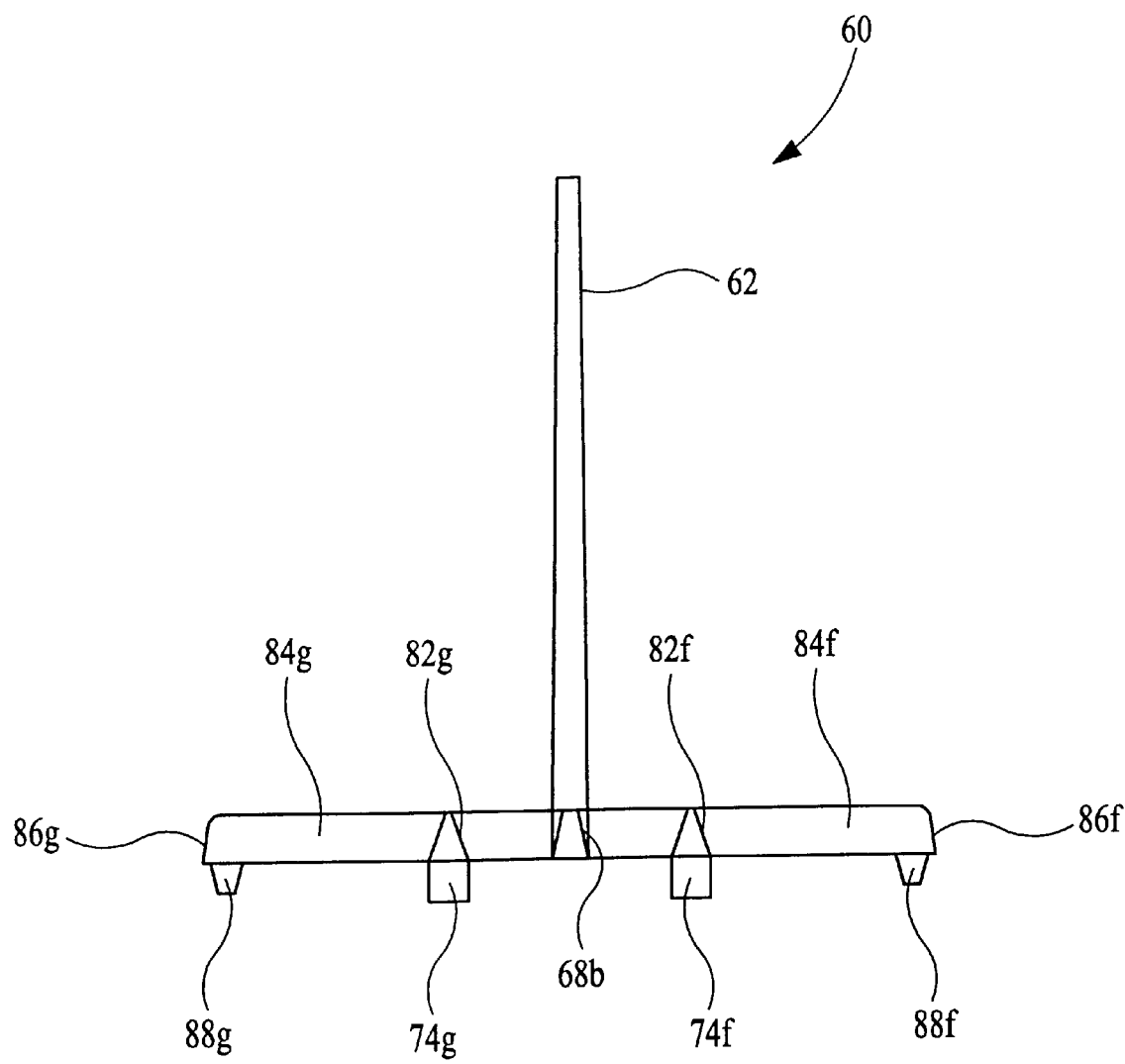
FIG. 10 is an end view of the runner system employing a turbulence inducing runner of the second preferred embodiment taken along plane 10—10 in FIG. 8.

Referring to FIG. 8, polymer material flowing through tertiary runner 74 encounters stepped turbulence inducing angle 76. Stepped turbulence inducing angles 76a–h are located at the end of tertiary runners 74a–h, respectively. Stepped turbulence inducing angles 76a–h are equivalent to one another and herein are referred to collectively as stepped turbulence inducing angle 76. Stepped turbulence inducing angle 76 agitates and mixes the polymer as it flows to a quaternary runner 78. It is preferred that quaternary runner 78 resides in the same plane as that of primary runner 66. Accordingly, stepped turbulence inducing angles 76 extend between the plane in which tertiary runner 74 extends and the plane in which quaternary runner 78 extends. Stepped turbulence angles 76a–h lead to quaternary runners 78a–h respectively. Quaternary runners 78a–h are equivalent to one another and herein are referred to collectively as quaternary runner 78. Quaternary runner 78 preferably resides in a horizontal plane above or below that of runner 74, thus stepped turbulence inducing angle 76 carries polymer material out of the plane of runner 74. However, the present invention includes arrangements and configurations in which quaternary runner 78 could reside in the same plane relative to tertiary runner 74. FIG. 9 shows the preferred relationship of quaternary runner 78 to tertiary runner 74, secondary runner 70, and primary runner 66. There is no limit with respect to the number of vertical changes employed by the present invention structures nor is there a limit with respect to the actual change in height by a branched runner.

Referring further to FIGS. 8 and 9, an opening 80 in each quaternary runner 78 leads to another branched runner hereinafter referred to as a discharge runner 84. Openings 80a–h communicate with runners 78a–h, respectively, leading into discharge runners 84a–h, respectively. Openings 80a–h, are equivalent to one another and herein are referred to collectively as opening 80. Discharge runners 84a–h are equivalent to one another and herein are referred to collectively as discharge runner 84. Additionally, curved end regions 82a–h are provided at the ends of quaternary runners 78a–h, respectively. Curved end regions 82a–h are equivalent to one another and herein are referred to collectively as curved end region 82.

Polymer material flows through quaternary runner 78 from which it may flow directly into discharge runner 84 via opening 80 or into curved end region 82. Curved end region 82 redirects polymer material back toward opening 80 and into discharge runner 84. Redirected polymer is agitated and subsequently mixed with polymer flowing directly into discharge runner 84.

The end of each discharge runner 84 is provided with a rounded curved end stop 86. Thus rounded curved end stops 86a–h reside at the end of discharge runners 84a–h, respectively. Curved end stops 86a–h are equivalent to one another and herein are referred to collectively as curved end stop 86. Each discharge runner 84 is also in communication with an exit port 88, leading to a mold cavity (not shown). Thus exit ports 88a–h are in communication with discharge runners 84a–h, respectively. Exit ports 88a–h are equivalent to one another and herein are referred to collectively as exit port 88.

Polymer material flows through discharge runner 84 and may either flow directly through exit port 88 into a mold cavity or may flow into curved end stop 86. Curved end stop 86 agitates and mixes polymer material, redirecting it back toward exit port 88. Redirected polymer material is then mixed with material flowing directly into exit port 88 (and into a mold cavity). FIG. 8 illustrates a runner system utilizing various aspects of the present invention, eg. incorporation of two (2) turbulence inducing runners (generally comprising runner components 70 and 74), and eight (8) turbulence inducing steps (component 76). It will be understood that the present invention encompasses runner systems using a greater or lesser number of turbulence inducing runners and turbulence inducing steps than those illustrated in FIG. 8. Moreover, it will be appreciated that the present invention encompasses runner systems using turbulence inducing runners and turbulence inducing steps, as described herein, independently of one another.

In the preferred embodiment runner systems in accordance with the present invention, as a result of having a balanced, symmetrical, or mirror image configuration, the various groups of runners are typically oriented at right angles with respect to other groups of immediately adjacent runners. And, the runners within a single group are typically oriented parallel to each other. For example, in the previously described runner systems 30 and 60, the secondary runners are all oriented parallel to each other, and perpendicular to the primary runner and all tertiary runners.

The present invention is not limited to any particular number of splits or branched runners as long as the runner system utilizes a balanced configuration. The actual number of branches depends on mold size and the number of mold cavities in a runner system.

There is no limitation regarding the number of turbulence inducing angles employed by an apparatus such as a turbulence inducing runner of the present invention. The number of steps in a step turbulence inducing angle system is also not limited to a specific number. The present invention encompasses any shape for a turbulence inducing angle, so long as the shape imparts a sufficient amount of turbulence to the polymeric material flowing therethrough. Restrictions associated with turbulence inducing angles are determined by, but not limited to, the mold size, the number of cavities, and the degree to which turbulence can be induced such that the viscosity value of the polymer is sufficiently low enough to prevent blockage of flow but not to the point where there is too much turbulence and shear resulting in excessive energy losses or an excessive generation of heat resulting in a breakdown of the polymeric material. Furthermore, all references to flow states of polymeric material, eg. pseudo-turbulent, are made with regard to the material within the runner system at temperatures, pressures, and flow rates that are typically employed in injection molding operations.

A turbulence inducing runner system of the present invention is preferably installed prior to any branched runners, which split into two flow paths other than the sprue. This is evident in FIG. 8 for example where a turbulence inducing runner such as runner 50 depicted in FIG. 7 is incorporated within the runner system 60 prior to the branched arrangement of runners 78 and 84. And, such system as shown in FIG. 8, comprises two (2) turbulence inducing runner devices. Turbulence inducing runners may be employed in any multiple cavity injection molding system. For example, an eight (8) cavity mold typically employs, but is not limited to, one (1) turbulence inducing runner system. Turbulence inducing steps, however, may be introduced at any point where the runner splits. No restriction is placed on runner dimensions. Runner dimensions should be selected and used according to known and recommended dimensions based on the size of parts to be molded and polymeric material chosen to form a molded part.

Although not wishing to be bound to any particular theory or numerical limits, it is believed that the present invention runner system maintains a minimum shear rate within a polymeric material flowing through the system under conditions suitable for injection molding. More particularly, it is believed that the present invention runner system maintains the noted shear rate such that the shear rate of polymer at the region of discharge into the mold cavities, i.e. at the gates, is preferably, at least about 40% of the shear rate of the polymer entering the runner system through a feed port or sprue. It is more preferred that the shear rate of polymer exiting the system be at least 50%, more preferably at least 60%, and most preferably, at least about 70% of the original shear rate of the polymer at the point of introduction of the polymer into the feed system.

The present invention runner system requires no additional devices, thereby allowing the costs of construction and maintenance of such systems to be kept low.

The foregoing description is, at present, considered to be the preferred embodiments of the present invention. However, it is contemplated that various changes and modifications apparent to those skilled in the art, may be made without departing from the present invention. Therefore, the foregoing description is intended to cover all such changes and modifications encompassed within the spirit and scope of the present invention, including all equivalent aspects.

We claim:

1. A runner system adapted for multiple cavity injection molding, said runner system comprising:
    a primary runner having a first end, a second end opposite from said first end, and defining a feed opening about midway between said first end and said second end;
    a first secondary runner disposed proximate to said first end of said primary runner, said first secondary runner having a first end, a second end, and defining an entrance opening about midway between said first end and said second end, said entrance opening providing communication between said first end of said primary runner and said first secondary runner;
    a second secondary runner disposed proximate to said second end of said primary runner, said second secondary runner having a first end, a second end, and defining an entrance opening about midway between said first end and said second end, said entrance opening providing communication between said second end of said primary runner and said second secondary runner;
    a plurality of tertiary turbulence inducing runners, each of said tertiary turbulence inducing runners disposed at a corresponding end of said first and second secondary runners, each said tertiary turbulence inducing runner comprising a first exit port, a second exit port opposite from said first exit port, and an inlet opening defined about midway between said first and second exit ports, said inlet opening providing communication between a respective tertiary turbulence inducing runner and a corresponding secondary runner;
    wherein upon introducing a flowable material into said feed opening of said primary runner under conditions suitable for injection molding, said material in said tertiary turbulence inducing runners is in a pseudo-turbulent state.

2. The runner system of claim 1 wherein said runner system has a balanced configuration with respect to said feed opening of said primary runner.

3. The runner system of claim 2 wherein said runner system has symmetrical configuration with respect to said feed opening of said primary runner.

4. The runner system of claim 3 wherein said runner system has a mirror image configuration with respect to said feed opening of said primary runner.

5. A turbulence inducing runner adapted for incorporation in a runner system for a multiple cavity injection molding system, said turbulence inducing runner comprising:
    a primary runner having a first end, a second end opposite from said first end, a feed entrance defined midway between said first end and said second end, a first turbulence inducing angle disposed between said feed entrance and said first end, and a second turbulence inducing angle disposed between said feed entrance and said second end;
    a first secondary runner disposed at and in communication with, said first end of said primary runner, said first secondary runner having a first end, and a second end opposite from said first end, and an opening defined at a midpoint between said first and second ends of said first secondary runner, said opening providing communication between said first secondary runner and said primary runner;
    a second secondary runner disposed at and in communication with, said second end of said primary runner, said second secondary runner having a first end, and a second end opposite from said first end, and an opening defined at a midpoint between said first and second ends of said second secondary runner, said opening providing communication between said second secondary runner and said primary runner; and
    a plurality of turbulence inducing steps, each disposed at and in communication with, a respective end of said first and second secondary runners;
    wherein said primary runner and said first and second secondary runners extend within a common plane, and said plurality of turbulence inducing steps extend within a plane different than said common plane.

6. The turbulence inducing runner of claim 5 wherein said runner exhibits a balanced configuration with respect to said feed entrance of said primary runner.

7. The turbulence inducing runner of claim 6 wherein said runner exhibits a symmetrical configuration.

8. The turbulence inducing runner of claim 7 wherein said runner exhibits a mirror image configuration.

9. The turbulence inducing runner of claim 5 wherein the configuration of said runner is such that upon administering a flowable polymeric material to said feed entrance of said primary runner at a pressure suitable for displacing said material through said runner and exiting through said plurality of turbulence inducing steps, said material exhibits pseudo-turbulent flow at said steps.

* * * * *